E. H. SHERBONDY.
TURBO COMPRESSOR BEARING.
APPLICATION FILED AUG. 1, 1918.
1,310,684.
Patented July 22, 1919.
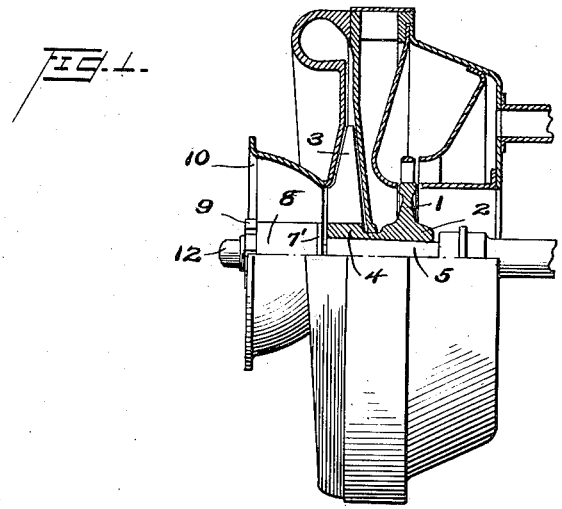
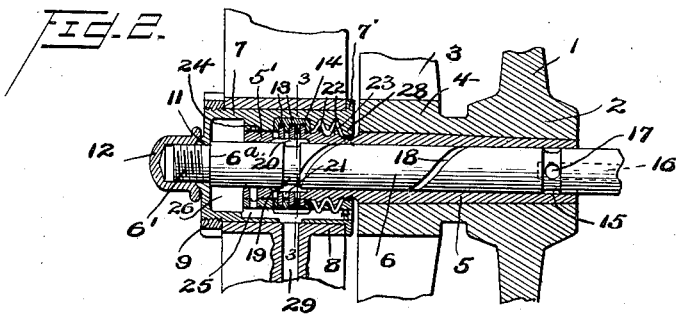
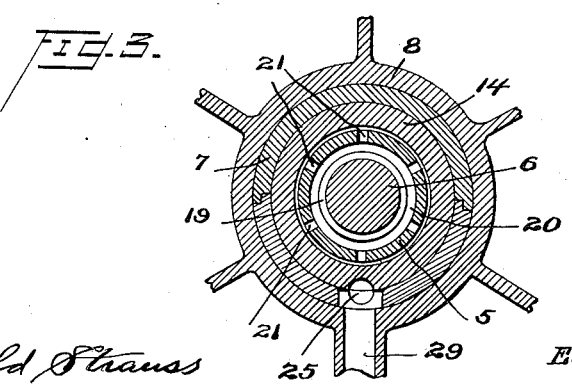

UNITED STATES PATENT OFFICE.

EARL H. SHERBONDY, OF CLEVELAND, OHIO.

TURBO-COMPRESSOR BEARING.

1,310,684.  Specification of Letters Patent.  Patented July 22, 1919.

Application filed August 1, 1918. Serial No. 247,851.

*To all whom it may concern:*

Be it known that I, EARL H. SHERBONDY, a citizen of the United States, residing at Cleveland, in the county of Cuyahoga and State of Ohio, have invented certain new and useful Improvements in Turbo-Compressor Bearings, (Case QQ,) of which the following is a specification.

This invention relates to a bearing for a turbo-compressor.

The turbo-compressor unit in question comprises the usual turbine wheel and the usual centrifugal compressor wheel, which are mounted to rotate together, the compressor wheel being driven by the turbine wheel.

The turbine is adapted to be operated by the waste gases from an internal combustion engine, and the compressor is adapted to supply air under pressure to the carbureters of said engine.

It is an object of the invention to produce a simple, compact and strong bearing, which is provided with automatic lubricating means, and which may be readily assembled and disassembled for inspection and replacement of parts.

One feature of the invention is that the main shaft for the bearing is fixed, the rotating element, which may be fastened to a suitable bearing collar rotating around this fixed shaft.

Another object of the invention is to provide oil carrying means between the fixed shaft and its associated collar, so designed that the relative rotation of these parts will cause proper circulation of the oil.

It is a further object of the invention to provide means for feeding oil to the usual thrust take up means that are commonly associated with turbine bearings.

Other objects and advantages will appear as the description proceeds.

In the drawings illustrating an embodiment of my invention, Figure 1 is a view partly in section, showing the turbo-compressor unit in position in its proper casing. Fig. 2 is a sectional view on an enlarged scale, of the bearing and associated parts; and Fig. 3 is a sectional view on a still more enlarged scale, on the line 3—3 of Fig. 2.

Referring now to these figures, the turbine wheel 1, provided with the usual hub 2, and the compressor wheel 3, provided with the usual hub 4, are either clutched together or made integral, so that they rotate together. As shown in Fig. 2, the two hubs 2 and 4 are made integral. The hubs 2 and 4 are bored out on a taper, and forced into this taper is the bearing collar 5, which is annular and which extends beyond the hubs of the two wheels into an annular portion 5'. The fixed shaft 6 is positioned within the bearing collar 5, as shown.

Surrounding the projecting portion 5' of the bearing collar, is the bearing collar housing 7. At one end this housing 7 is provided with the annular flange 7', which is adapted to bear against the annular mounting ring 8. Toward its other end the housing 7 is externally screw threaded to provide engaging means for a nut 9. It is evident that tightening up of the nut 9 will draw the flange 7' into engagement with the mounting ring 8, to position the housing 7 in place. The mounting 8 may be held in place by any suitable means, which need not be gone into here, in the air intake mouth 10 for the compressor wheel 3.

The housing 7 is centrally apertured as at 11, to allow the screw threaded end 6' of the shaft 6 to pass therethrough. The provision of the screw threaded portion 6' defines a shoulder 6ª on the shaft 6, which is brought into intimate engagement in the inner wall of the housing 7, by tightening up a screw cap 12, which engages with the screw threaded portion 6', and with the outside wall of the housing 7. It should be noted, that tightening up this cap 12 will accurately position the shaft 6 in the housing 7.

Means may be provided to take up the end thrust, such means being here shown as comprising a series of thrust flanges 13, which may be made integral with the portion 5' of the bearing collar. These flanges 13 may turn in suitable grooves cut in a collar 14 of babbitt carried in a suitable groove in the bearing collar housing 7.

Means for lubrication of the moving parts will now be described. Oil is led to an annular groove 15, cut in the shaft 6 toward one end of the bearing collar 5, as shown, through the oil duct 16, and one or more radial holes 17 communicating, respectively, with the passage 16 and the groove 15. Cut in the exterior of the shaft 6 is a spiral oil groove 18 which at one end opens into the annular groove 15, and which after winding around the exterior of the shaft, delivers oil into the annular groove 19, cut in the shaft 6, this groove 19 being preferably adjacent the thrust flanges 13. The portion 5′, with the bearing collar, is provided with groove 20 cut on the interior thereof, the groove 20 being just exteriorly of the groove 19. Small radial holes 21 may be bored between the thrust flanges 13 to lead oil from the groove 20 to these flanges.

The portion 5′ of the bearing collar may be provided with one or more annular flanges 22, the purpose of these flanges being to throw off oil by centrifugal force, which may have escaped past the thrust flanges. The oil thus thrown off is collected in annular chambers 23, cut in the interior of the collar housing 7. The annular rim-like portion 28 of the collar 7 extends into close proximity to the collar 5 to complete the right-hand chamber 23. The oil that escapes the other way from the thrust flanges, is collected in a groove 24 cut in the collar 7. The lower part of the collar 7 has cut therein a longitudinal groove 25, which drains oil from the oil collecting chamber 23, and the oil collecting groove 24, and also from the oil collecting chamber 26, this latter chamber being located toward the extreme end of the collar housing 7.

The spiral groove 18 is cut in the shaft 6 in such a direction that when the bearing collar 5 rotates therearound, the friction between said collar and the oil in said groove will cause the oil to be forced toward the thrust flanges. It may be noted in this connection that the faster the rotating elements travel, the more oil will be forced along the groove 18. The oil, after leaving the oil collecting groove 25, may escape through a suitable drain 29.

To summarize, the wheels 1 and 3 are fixedly mounted with respect to the bearing collar 5, and rotate therewith. The shaft 6 is fixed; the groove 18 in the exterior of this shaft provides a film of oil on the outside thereof, on which the bearing collar 5 rotates. The bearing collar housing 7 and mounting ring 8 are of course fixed. The oil forced through the spiral groove 18 is fed to the thrust flanges, under more or less pressure, some of it escaping to the left between the lefthand end of the shaft 6 and the extreme lefthand end of the collar 5′, to provide a suitable lubricating film for this end of the shaft, this oil finally escaping into the drain passage 26. The several quantities of oil, after having lubricated the several parts, are collected in the drain 25, and pass out through the drain 29.

While I have illustrated a possible embodiment of my invention, it should be understood that it may be carried out in other ways, as defined within the scope of the appended claims.

I claim—

1. In a bearing assembly, a fixed shaft, a rotatable bearing collar, a fixed bearing collar housing and means to clamp said bearing collar housing in place in a suitable standard.

2. In a bearing assembly, a fixed shaft, a rotatable bearing collar, a fixed bearing collar housing, means to clamp said bearing collar housing in place in a suitable standard, and means engaging with said shaft and said bearing collar housing, to fix said shaft with relation to said bearing collar housing.

3. In a bearing assembly, a fixed shaft, a rotatable bearing collar, a fixed bearing collar housing, means to clamp said bearing collar housing in place in a suitable standard and interengaging thrust-take-up means carried by said bearing collar and said bearing collar housing.

4. The combination, as claimed in claim 3, said shaft being provided with means to distribute lubricant to its outer surface and to said thrust-take-up means.

5. In a bearing assembly, a fixed shaft, a rotatable bearing collar, a fixed bearing collar housing, means to clamp said bearing collar housing in place in a suitable standard, said shaft being provided with means for distribution of lubricant therealong.

In testimony whereof I affix my signature.

EARL H. SHERBONDY.